April 26, 1960  G. D. MYLANDER  2,934,085

CHECK VALVE HAVING EXPANDABLE SIDE WALL

Filed Nov. 15, 1956

INVENTOR.
Gerald D. Mylander.
BY
Albert J. Henderson
HIS ATTORNEY.

United States Patent Office 2,934,085
Patented Apr. 26, 1960

2,934,085

CHECK VALVE HAVING EXPANDABLE SIDE WALL

Gerald D. Mylander, Fullerton, Calif., assignor to Robertshaw-Fulton Controls Company, Richmond, Va., a corporation of Delaware Application November 15, 1956, Serial No. 622,336

3 Claims. (Cl. 137—543.19)

This invention relates to pressure responsive valves and more particularly to a check valve operative to prevent fluid flow in one direction.

Although the function of a check valve is extremely simple, it has been found that current check valves will not operate under all the various conditions which exist in fluid systems. The conditions most often encountered are extremes of pressure and temperature, fluid hammer, gums or particles in the fluid, abrasives and corrosives in the fluid, and vibration and acceleration of the fluid. As a result of the numerous conditions encountered, present check valves are subject to requirements of low cracking pressure, low pressure drop, low leakage rate and minimum weight.

In most systems, the check valve comprises a flat circular, spherical, or conical seat which is cooperable with a ball, poppet, or disc shaped valve member. These designs are all susceptible to clogging open if foreign substances are deposited on the seating surfaces. Although the use of soft materials in the seating surfaces eliminates clogging to some extent, it has been found that such materials are inclined to deteriorate rapidly. Very fine finishes have also been used on the seating surfaces to prevent clogging, but this method is unsatisfactory in that the finish is easily damaged by abrasives and corrosives. In addition, it has been found that current check valves will not seal satisfactorily under vibration and acceleration without high spring forces to hold them closed. The use of high spring forces results in high cracking pressures and high pressure drops across the valve member. Accordingly, it will be apparent that current forms of check valves do not meet the bare requirements for top performance in any type of system.

It is an object of this invention to substantially eliminate the effect of the above described conditions on a check valve.

Another object of this invention is to produce a check valve having a seating surface and a valve member cooperable with the seating surface in such a manner that collection of foreign particles on the seating surface is substantially prevented.

Another object of this invention is to produce a check valve wherein sealing is effected by movement of the valve member laterally in the direction of fluid flow.

Another object of this invention is to produce a check valve which is substantially unaffected by temperature variations.

Another object of this invention is to produce a check valve which is substantially unaffected by fluid hammer.

Another object of this invention is to produce a check valve wherein the valve member is mounted for sliding engagement with a seating surface to prevent depositation of foreign particles on the seating surface.

In the preferred embodiment of the invention, a casing is provided with a passage therethrough for fluid and has a generally annular seating surface formed on the wall thereof within the passage. A generally cylindrical valve member is mounted for axial movement within the passage relative to the seating surface and is adapted to be slidably received by the surface upon reversal of fluid flow through the passage. The valve member is of smaller diameter than the seating surface and provided with a flexible wall. Stop means are positioned to be engaged by the valve member when the same is in sliding engagement with the seating surface whereby radial expansion of said wall of said valve member will occur under the force of fluid flow through said passage to thereby move the wall of the valve member into sealing engagement with said surface.

Other objects and advantages become apparent from the following description taken in connection with the accompanying drawing wherein.

Figure 2:
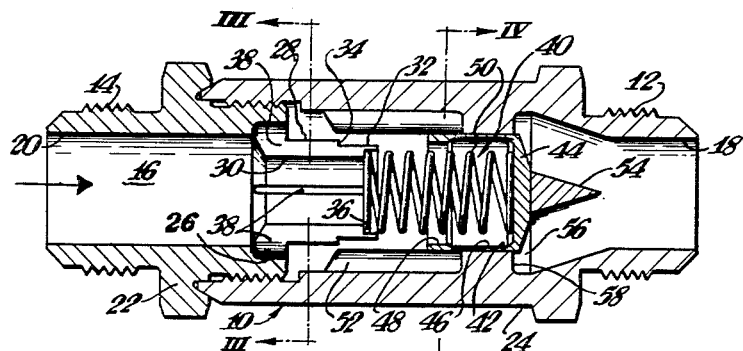
Fig. 2 is a view similar to Fig. 1 showing the parts of Fig. 1 in another controlling position.
Figure 3:
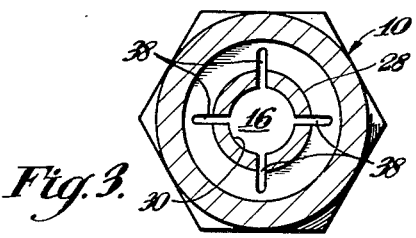
Fig. 3 is a section taken along the line III—III of Fig. 2.

Referring more particularly to the drawing, the check valve comprises a casing 10 of generally cylindrical configuration and having threaded end portions 12, 14 for connection in a pipe or fluid system. The casing 10 is provided with an axial passage 16 extending therethrough and defining an inlet opening 18 at the end of the portion 12 and an outlet opening 20 at the end of the portion 14.

The casing 10 is formed in two portions 22, 24, the casing portion 24 being threaded on the end of the casing portion 22 in axial alignment therewith. The casing portion 22 is increased in diameter at the interior end thereof to define an annular recess 26. A boss 28 is fixed within the recess 26 by any suitable means and is provided with an axial bore 30 through which fluid may flow from the inlet 18 to the outlet 20.

The boss 28 projects toward the inlet 18 and is provided with a reduced diameter portion 32 on the end thereof defining an annular shoulder or stop 34. A second annular shoulder 36 is provided on the boss 28 within the bore 30. The boss 28 is also provided with a plurality of longitudinal ports or slots 38 for flow of fluid through the boss 28 when the bore 30 is closed by means now to be described.

A valve member, indicated generally by the reference numeral 40, is positioned for axial movement within the passage 16 and for cooperation with an annular seating surface 42 formed on the wall of the casing 10 within the passage 16. The valve member 40 is of generally cylindrical cup-shaped configuration and of slightly smaller diameter than the surface 42 to thereby be slidably received within the surface 42 as shown more clearly in Fig. 2.

Referring more particularly to the construction of the valve member 40, this member is provided with a rigid end wall 44 closing the inlet end thereof and a flexible peripheral wall portion 46. The outlet end of the valve member 40 is open to permit pressure of the fluid within the passage 16 to act on the interior surface of the valve member 40 as will later become apparent.

Figure 1:
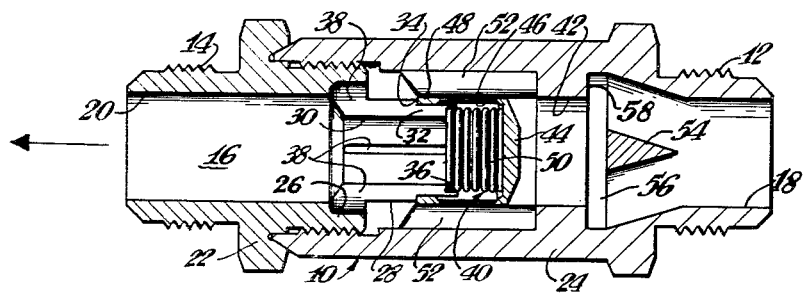
Fig. 1 is a longitudinal sectional view of a check valve embodying this invention.
Figure 4:
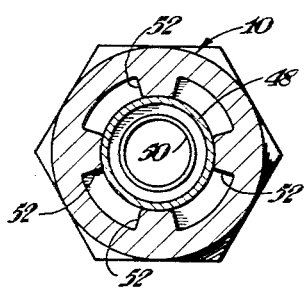
Fig. 4 is a section taken along the line IV—IV of Fig. 2.
Figure 5:
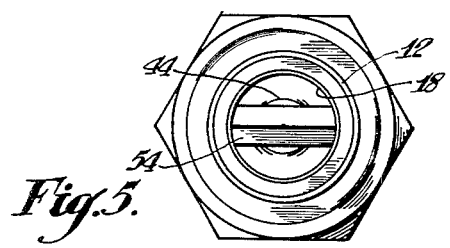
Fig. 5 is an end view of the check valve shown in Figs. 1 and 2.

The outlet end of the flexible wall of the valve member 40 is provided with an annular lug 48 which is adapted for sliding engagement with the portion 32 upon axial movement of the valve member 40 toward the outlet 20 as shown more clearly in Fig. 1. A spring 50 is mounted in compression between the shoulder 36 and the end wall 44 and serves to bias the valve member 40 toward the surface 42.

To guide the valve member 40 during axial movement thereof between the surface 42 and boss 28, a plurality of ribs 52 are provided in the passage 16 and may be formed integral with the casing 10 as shown or formed separately and fixed to a wall of casing 10 by any suitable means. The surfaces of the ribs 52 define a bore in axial alignment with the surface 42 and slidably engage the periphery of the valve member 40 during axial movement thereof. The spacing between the ribs 52 is such that fluid may flow therebetween around the valve member 40 between the inlet 18 and outlet 20.

The shoulder 34 limits axial movement of the valve member 40 toward the outlet 20 as shown in Fig. 1. To limit axial movement of the valve member 40 toward the inlet 18, a stop member 54 is positioned in axial alignment with the passage 16 and carried by a suitable ported flange 56 which engages a shoulder 58 of the casing 10 and is fixed thereto by any suitable means. As shown more clearly in Fig. 2, the end wall 44 of the valve member 40 engages the stop member 54 when the flexible wall portion 46 engages the surface 42 thereby limiting further movement of the valve member 40.

In operation of the device, the valve member 40 is positioned axially within the passage 16 by fluid flow between the inlet 18 and outlet 20. As shown in Fig. 1, fluid normally flows from the inlet 18 to the outlet 20 in the direction of the arrow. In this normal condition of operation, the fluid pressure will act on the inlet side of the end portion 44 and effect movement of the valve member 40 against the bias of the spring 50 toward the boss 28 and into engagement with the shoulder 34 as shown. The valve member 40 will remain in engagement with the shoulder 34 during normal flow of fluid through the device. In this position of the valve member 40, fluid will flow between the ribs 52 and through the slots 38 in the boss 28 and out the outlet 20.

If now a reversal in the direction of fluid flow should occur, the pressure of the fluid will no longer act on the end portion 44, and the valve member 40 will move axially toward the stop 54 under the combined biasing force of the spring 50 and fluid flow in the opposite direction. The valve member 40 will move under this bias until the end wall 44 engages the stop member 54 in the position shown in Fig. 2. At the instant the valve member 40 engages the stop 54, flow of fluid through the passage 16 in this reverse direction will be substantially prevented except for a small leakage between the periphery of the portion 46 and the surface 42. However, immediately following engagement of the end wall 44 with the stop member 54, the fluid pressure within the interior of the valve member 40 will substantially increase and become operative to effect radial expansion of the flexible wall 36 into tight sealing engagement with the surface 32 to completely seal and close the passage 16.

When the direction of fluid flow is again reversed to the normal condition indicated in Fig. 1, the valve member 40 will be moved out of engagement with the stop 54 and returned to the position shown in Fig. 1 against the bias of the spring 50. Thus, the valve member 40 will be reciprocated between the stop 54 and shoulder 34 in response to reversals in direction of fluid flow through the passage 16 and prevent flow of fluid when in engagement with the stop 54, but permit flow when in engagement with the shoulder 34.

It will be apparent that the device is substantially unaffected by deposit of foreign particles or material on the seating surface 42 since the sliding movement of the valve member 40 within the surface 42 will have a wiping effect thereon and maintain the same clean or free from damaging deposits. Although the valve member 40 is slidably movable within the seat 42, the radial expansion of the wall 46 effects a tight seal and eliminates any leakage that normally occurs between sliding parts.

Furthermore, it will be apparent that since the seating surface 42 is parallel to the direction of fluid flow through the passage 16, there will be less tendency for such foreign particles to deposit thereon than in the conventional poppet valve structure wherein the seating surface is normal to the direction of fluid flow. Accordingly, the movement at the wall portion 46 laterally of the direction of fluid flow into engagement with the surface 42 is one of the important features of this invention.

It is also to be noted that the relatively wide surfaces of the wall portion 46 and seating surface 42 provide a long leakage path and therefore do not require a fine finish. The flexible construction of the wall portion 46 also provides a large seating surface which conforms easily to the irregularities of the seating surface 32. Furthermore, the flexible construction of the valve member 40 results in a movable part of extremely light weight and thereby insensitive to vibration and acceleration in a velocity of fluid flow through the passage 16.

Another important feature of this invention is that the entire valve member 40 may be formed as an integral part of the same material as the other parts of the device. This construction results in a valve structure which is substantially unaffected by extremes in temperature variations since uniform expansion occurs. It is also to be noted that fluid pounding or impact cannot harm the seating surface comprising the portion 46 and seat 32 in that the rigid end portion 44 and shoulder 34 absorb the impact.

While only one embodiment of the invention has been herein shown and described, it will be apparent to those skilled in the art that many modifications in the construction and arrangement of parts may be made without departing from the scope of the invention as defined in the appended claims.

It is claimed and desired to secure by Letters Patent:

1. A check valve comprising a casing having a passage extending therethrough for the flow of fluid, an annular valve seating surface extending within said passage adjacent an end of said casing and being substantially parallel to the flow axis of the fluid, a first and a second stop means disposed in said passage, said first stop means being positioned adjacent said valve seating surface, a generally cup-shaped valve member having a flexible side wall slidably mounted within said passage and having a relatively rigid bottom wall closing one end thereof, said valve member being movable between positions engaging said first and second stop means in accordance with changes in direction of fluid flow within said passage, and a plurality of ribs disposed in said casing for guiding movement of said valve member, said side wall of said valve member having a smaller diameter than said valve seating surface and being adapted to be expanded laterally of said flow axis by the fluid upon engagement of said end wall with said first stop means to engage said side wall with said valve seating surface for controlling the flow of fluid through said passage.

2. A check valve comprising a casing having a passage extending therethrough for the flow of fluid, an annular valve seating surface on said casing substantially parallel to the flow axis of the fluid and extending inwardly to form a restriction in said passage, a generally cup-shaped valve member having a flexible sidewall slidably mounted within said passage and cooperable with said surface for controlling the flow of fluid through said passage, a plurality of ribs disposed in said casing adjacent said valve seating surface for engaging said side wall and guiding movement of said valve member, said valve member being of smaller diameter than said surface and being axially movable into and out of sliding engagement with said surface in accordance with changes in the direction of fluid flow through said passage, first stop means engaging said valve member and limiting movement thereof in response to fluid flow in one direction, the pressure of fluid flow in said one direction being adapted for expanding said side wall of said valve member laterally of said flow axis to cause engagement of said side wall with said seating surface for preventing fluid flow, and a second stop means in said passage engaging said valve member and limiting movement thereof in response to fluid flow in another direction, the pressure of fluid flow in said another direction being adapted for holding said valve member against said second stop means and adjacent said guide ribs whereby fluid is adapted to flow between said guide ribs and through said casing.

3. A check valve comprising a casing having a passage providing an inlet and an outlet for fluid, an annular valve seat having a cylindrical inner wall projecting into said passage, a pair of oppositely disposed stop means on either side of said valve seat respectively, a cup-shaped valve member having a flexible side wall and a relatively rigid bottom wall, said valve member being mounted for movement in said passage between positions established by said stop means, said side wall slidably engaging said inner wall of said valve seat in one of said positions, a plurality of guide ribs projecting into said passage for operative engagement with said side wall during movement of said valve member to another said position, and means for biasing said valve member to said one position with said side wall adapted to be expanded into sealing engagement with said inner wall by pressure of the fluid in one direction on said valve member, said biasing means being adapted for yielding under pressure of the fluid in an opposite direction for causing movement of said valve member to said other position out of said sealing engagement with said inner wall.

References Cited in the file of this patent

UNITED STATES PATENTS

| | | |
|---|---|---|
| 430,689 | Riggs et al. | June 24, 1890 |
| 2,202,123 | Strode | May 28, 1940 |
| 2,211,212 | Langdon | Aug. 13, 1940 |
| 2,653,792 | Sacchini | Sept. 29, 1953 |
| 2,800,142 | Champion | July 23, 1957 |

FOREIGN PATENTS

| | | |
|---|---|---|
| 1,031,887 | France | Mar. 25, 1953 |